United States Patent [19]

Lu

[11] Patent Number: 5,503,470

[45] Date of Patent: Apr. 2, 1996

[54] AUTOMATIC DISC DELIVERING CONTAINER FOR DIGITAL SIGNAL RECORDING DISCS

[76] Inventor: Shao-Lung Lu, No.7, Lane 1051, Yung-An Road, Tao-Yuan, Tao-Yuan Hsien, Taiwan

[21] Appl. No.: 302,323

[22] Filed: Sep. 8, 1994

[51] Int. Cl.[6] .................................................. A47B 81/06
[52] U.S. Cl. ........................................ 312/9.34; 312/9.41
[58] Field of Search ................................. 312/9.14, 9.15, 312/9.22, 9.29, 9.34, 9.41

[56] References Cited

U.S. PATENT DOCUMENTS

| | | | |
|---|---|---|---|
| 1,258,498 | 3/1918 | Stuebing et al. | 312/9.14 |
| 1,504,900 | 8/1924 | Roehrich | 312/9.34 |
| 5,275,480 | 1/1994 | Hyman et al. | 312/9.14 |

Primary Examiner—James R. Brittain
Assistant Examiner—Gerald D. Anderson
Attorney, Agent, or Firm—Morton J. Rosenberg; David I. Klein

[57] ABSTRACT

The present invention relates to an automatic disc delivering container for digital signal recording discs in which a thumb tab is shifted to cause a gear to move at the same time and finally engage with another gear provided on a selected disc retaining means. At this point, the selected disc retaining means can automatically spring out of the disc container from an opening thereof when the cover of the disc container is opened while the other non-selected disc retaining means keep staying inside the disc container. The present invention is characterized in that any desired disc stored in the container can be conveniently selected and sprung out automatically one at a time without reversely touching and dragging out any other non-selected discs from the disc container.

6 Claims, 10 Drawing Sheets

5,503,470

AUTOMATIC DISC DELIVERING CONTAINER FOR DIGITAL SIGNAL RECORDING DISCS

BACKGROUND OF THE INVENTION

The present invention relates to a container for storing digital signal recording discs, such as compact discs, laser discs, compact disc read-only memory, rewritable optical discs, etc., and more particularly to a disc container which is provided with a locating mechanism for quickly selecting one single desired disc from a number of discs stored inside the container while the selected disc can be conveniently replaced back to the container after use.

With the popularity of portable laser disc player, portable laser disc container becomes important, too. A common portable laser disc container may usually contain about 6 pieces of disc with the discs overlapping over one another and therefore not easily located and picked out from the container. Moreover, since such portable disc container is usually used while the user is standing or walking, the user has to hold the container with one hand and inconveniently locate the desired disc with another hand. Furthermore, the overlapped discs are not easily separated from one another especially when the user has to do this with only one hand.

There are still other disadvantages existed in the common disc container. One example of such disadvantages is the widely opened container covers cause the discs therein to radially spread and be exposed to the air and accordingly the dust in the air. It is still not easy to take one single disc from the container even all the discs are radially spread because the spread angle between each two discs is not big enough for the user to pick out the desired disc with fingers. In addition, the discs might very possibly fall down to the ground in the event they are not carefully handled while they are radially spread in the opened container.

FIGS. 9 through 12 illustrate a conventional container 40 for digital signal recording discs. The disc container 40 mainly includes a plurality of beads 41 and an upper and a lower springy clamps 42, 43 for controlling the delivery of one single desired disc from the container each time. The shortcoming of this type of disc container 40 is that the container has disc retaining plates 44 each of them has a so small thickness that it is very difficult for a user to catch one of the desired disc retaining plates 44 with his or her finger which is apparently thicker than the disc retaining plate 44 without touching and moving discs at two sides of the desired disc. A disc has a thickness about 1.25 mm only, and, to minimize the overall volume of the disc container while maximize the numbers of disc to be carried, the disc retaining plates 44 are designed to be as thin as possible (about 2.5 mm). On the other hand, the thickness of a finger is more than 12 mm. It can be imagined that more than one disc retaining plate 44 will be caught at a finger holding member 45 thereof at the same time instead of removing only one single desired disc from the container.

SUMMARY OF THE INVENTION

It is therefore a primary object of the present invention to provide an automatical disc delivering container for digital signal recording discs from which only one single desired disc can be effectively located and delivered from the container each time.

DETAILED DESCRIPTION OF THE PREFERRED EMBODIMENTS

Figure 1:
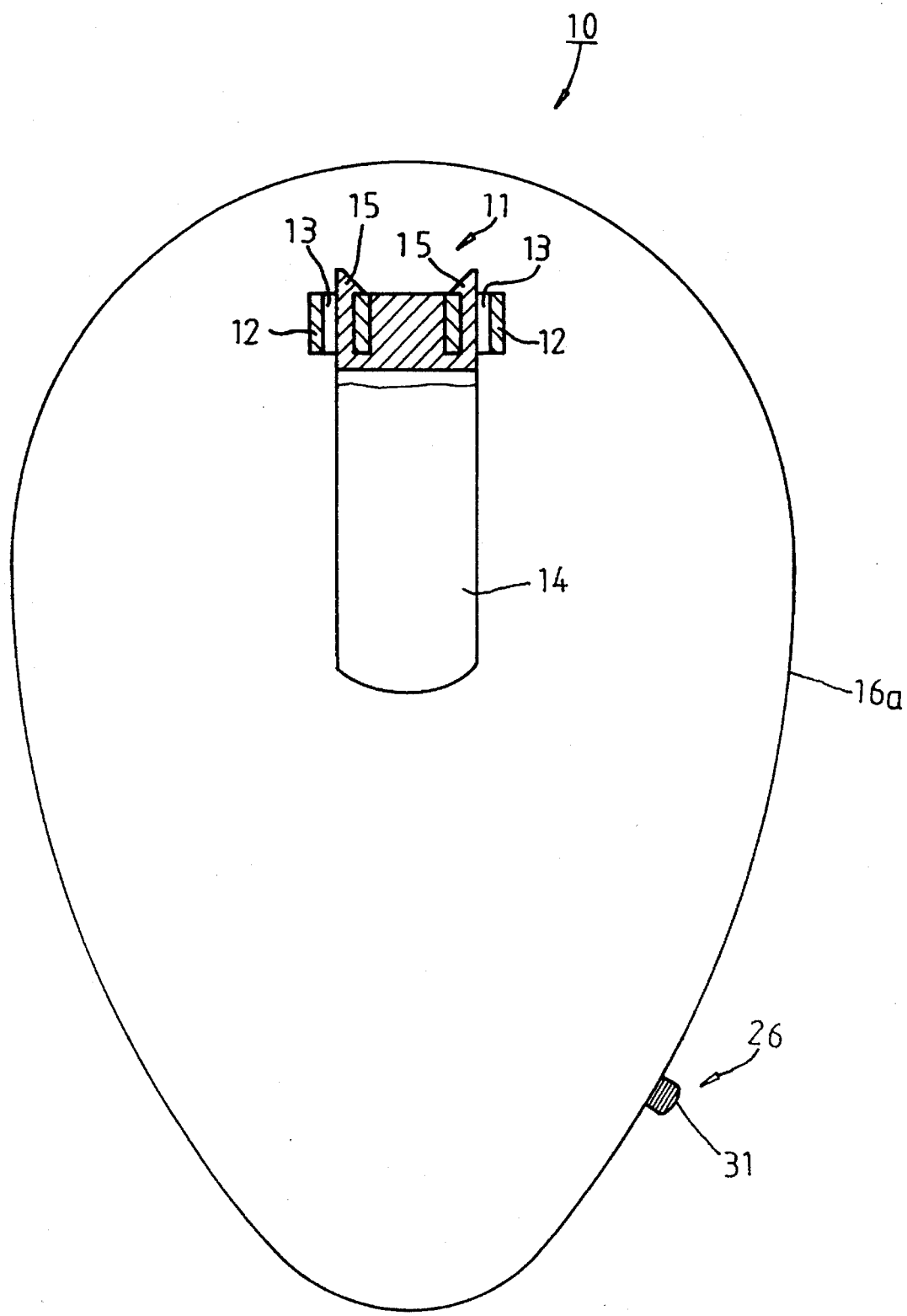
FIG. 1 is a front elevational view of the disc container according to the present invention.
Figure 2:
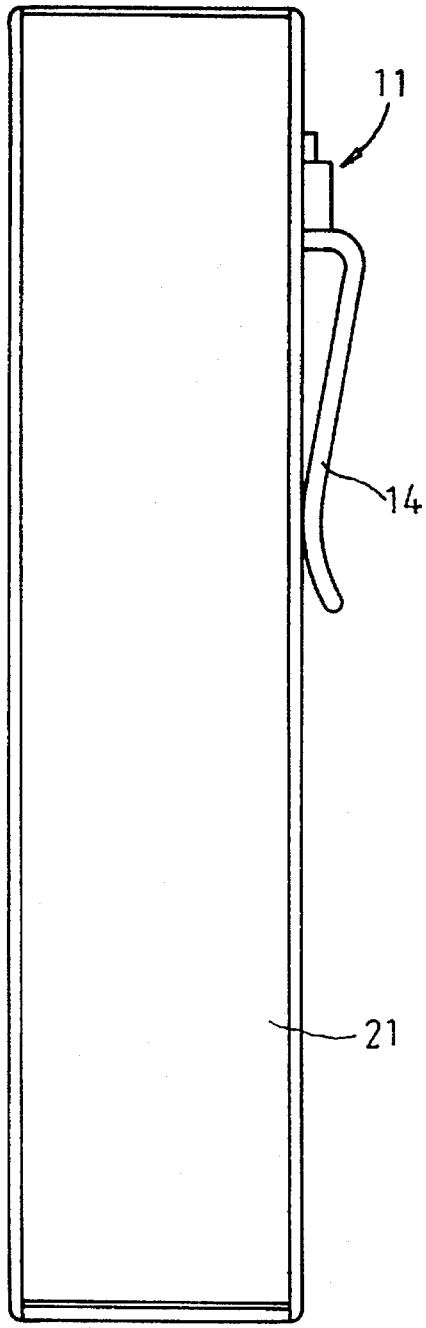
FIG. 2 is a left side view of the present invention.
Figure 3:
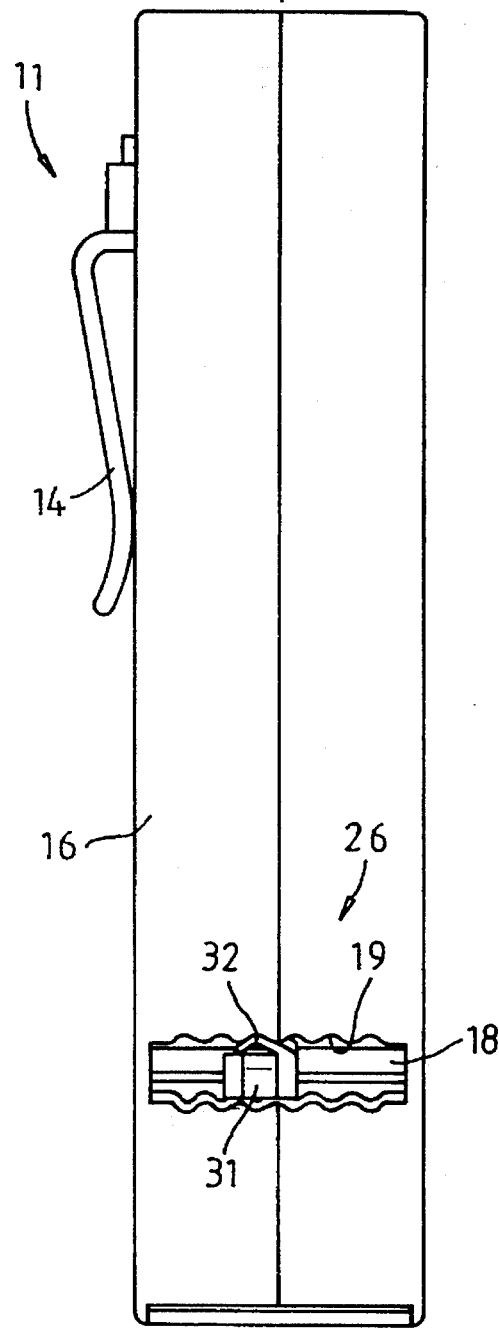
FIG. 3 is a right side view of the present invention.

Please refer to FIGS. 1 through 5. The present invention relates to an improved digital signal recording disc container 10 which mainly comprises a housing 38 having a belt-clamp mechanism 11 provided at one outer side surface thereof, at least two disc retaining means 24 provided inside the housing 38, and a disc locating and delivering mechanism 26.

The housing 38 consists of a case portion 16 and a cover portion 21. The case portion 16 provides a disc room 39 therein for accommodation of a number of discs A to be packed and carried in the disc container 10, and includes a first hook 17, a disc-selection sliding guide 18 provided at a first edge 16a of the case portion 16 and being formed with a plurality of locating portions 19, and an opening 20.

The belt-clamp mechanism 11 includes a fixing portion 12 which is integrally formed with the housing 38 and is provided with two through holes 13, and a flexible clamping member 14 having two oppositely disposed hooks 15 which separately corresponds to and hooks on the two through holes 13 such that the disc container 10 can be attached to a user's waist belt by means of the flexible clamping member 14.

The cover portion 21 is pivotally connected at one end to an inner side of the case portion 16 by means of a pivot spindle 40 or any other suitable means so that the cover portion 21 may close or move away from the opening 20 of the case portion 16. The cover portion 21 is provided at another end with a second hook 22 which may engage with or disengage from the first hook 17 of the case portion 16, and a turnable setting portion 23 which may stop the case portion 16 when the cover portion 21 is opened so as to limit the open angle of the cover portion 21 relative to the case portion 16.

The disc retaining means 24 of the disc container 10 are superposed on one another and are pivotally connected at one end to the inner side of the case portion 16 so as to be pivotally turnable relative to the case portion 16. Each of the disc retaining means 24 has two supporting ends 25 which can springily but firmly hold a disc A therebetween.

The disc locating and delivering mechanism 26 is disposed inside the case portion 16 and includes a support spindle 27 fixedly or rotatably mounted in the case portion 16, a plurality of first gears 28 separately disposed on one end of each disc retaining means 24 either integrally formed with the disc retaining means 24 or connected thereto by means of other fittings, a second gear 29 indirectly put over the support spindle 27 such that the second gear 29 may move along the support spindle 27 to selectively engage with one of the first gears 28, a spring 30 disposed between the second gear 29, the support spindle 27, and the case portion 16 to enable the second gear 29 to turn relative to the case portion 16, and a thumb tab 31 put over the support spindle 27. The thumb tab 31 has an integrally formed hook portion 32 capable of selectively engaging with one of the locating portions 19 of the disc-selection sliding guide 18 at the first edge 16a of the case portion 16. The thumb tab 31 may also clamp the second gear 29 to together move along the support spindle 27.

Figure 4:
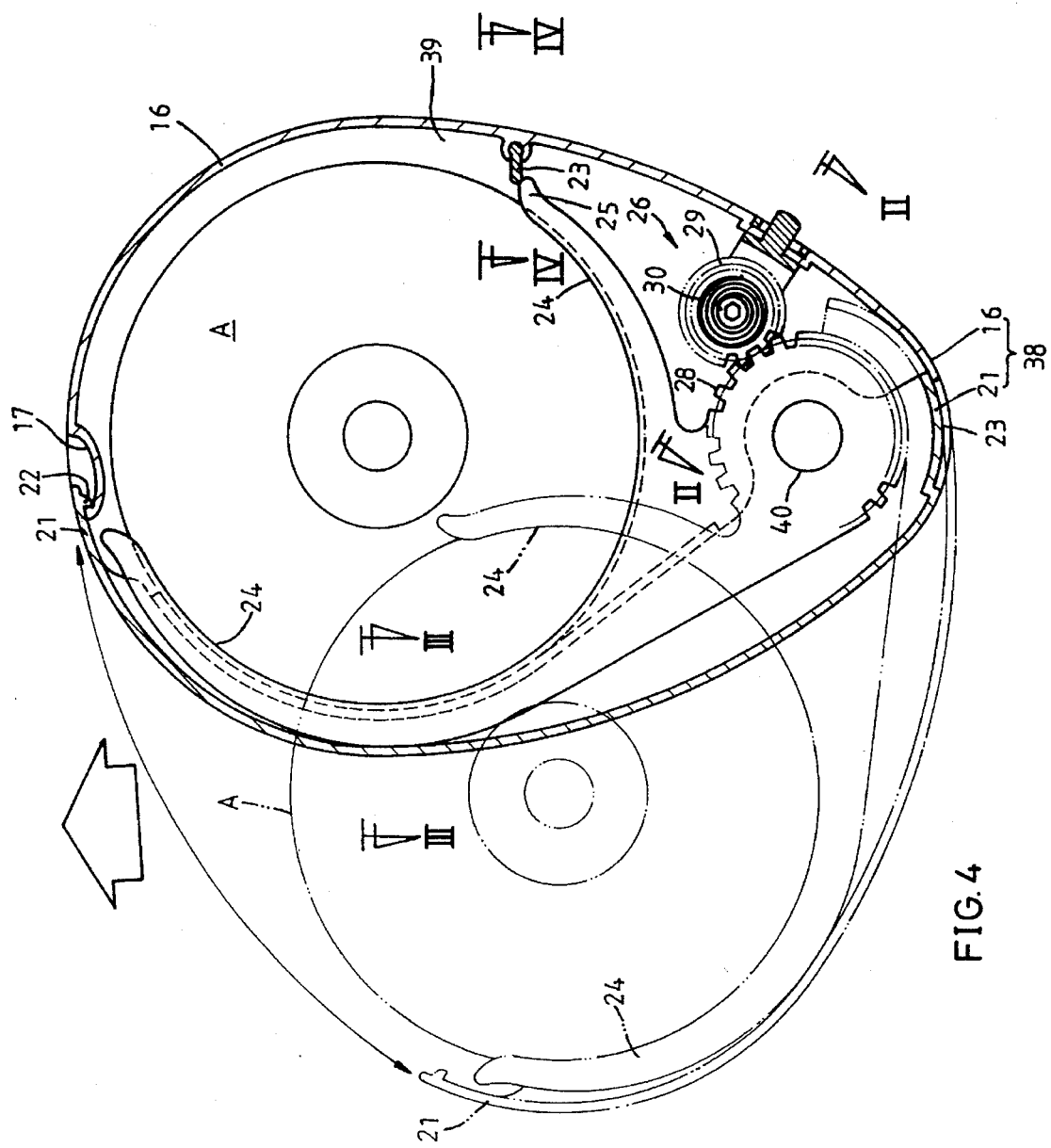
FIG. 4 is a sectional view taken on line I—I of FIG. 3.
Figure 7:
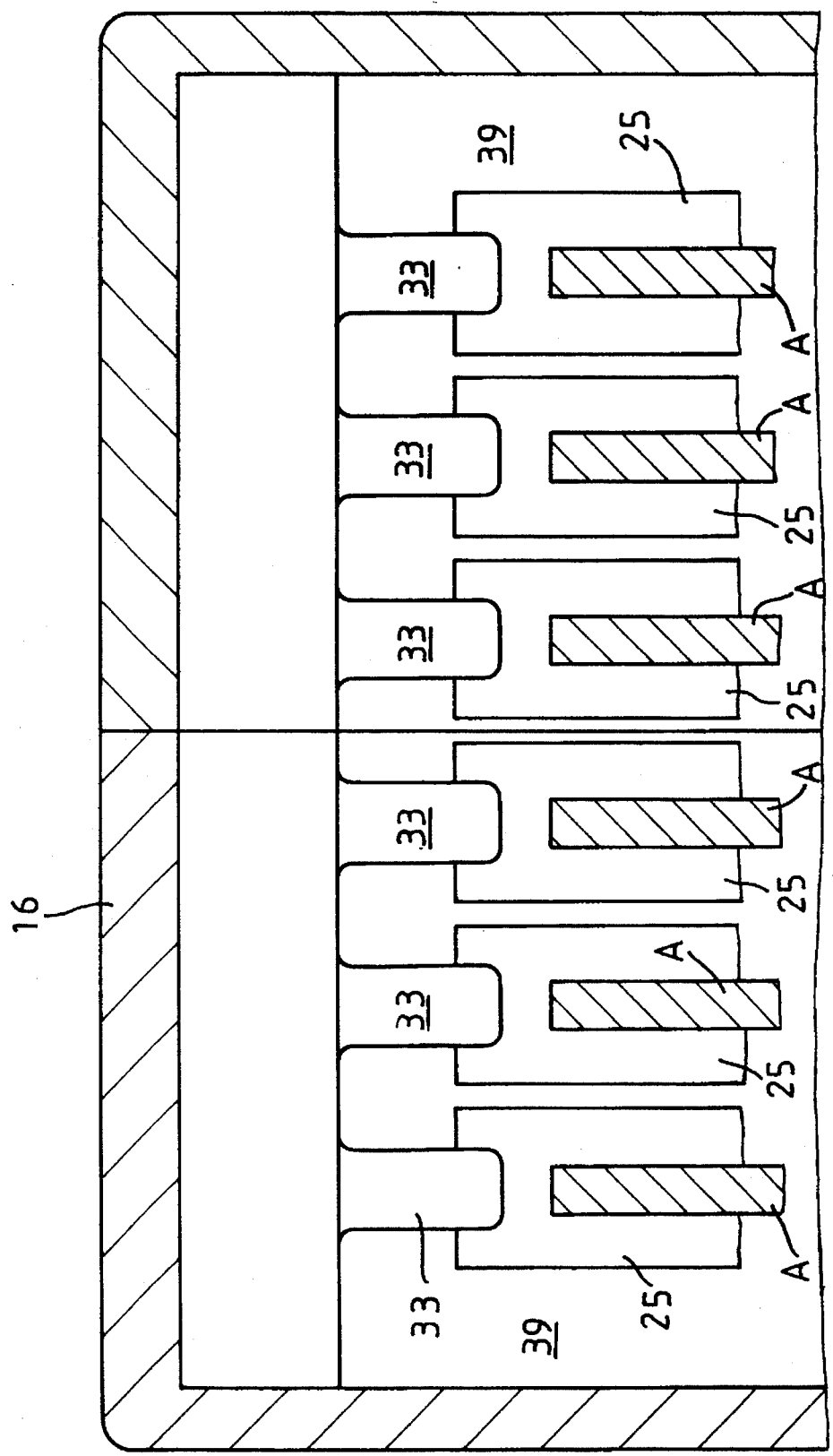
FIG. 7 is a fragmentary, enlarged sectional view taken on line IV—IV of FIG. 4.

Please refer to FIGS. 4 and 7. The case portion 16 further includes a plurality of retaining spring leaves 33 integrally formed with or additionally embedded into the case portion 16 to each hold a support end 25 of the disc retaining means 24 lest the other non-selected disc retaining means 24 should be delivered out of the case portion 16 along with the selected one.

When the cover portion 21 is closed to cover the opening 20 of the case portion 16, the spring 30 is under pressure to generate a spring force. The user may operate the thumb tab 31 with his thumb or fingers so that the thumb tab 31 slides along the disc-selection sliding guide 18 of the case portion 16 to a desired position. Then, when the cover portion 21 is opened, the spring 30 shall drive the second gear 29 to rotate which in turn drives the first gear 28 of the selected disc retaining means 24 to rotate, causing the selected disc retaining means to be sprung out of the case portion 16 via the opening 20. By this way, only one single desired and selected disc retaining means 24 can be automatically and effectively delivered out of the disc container 10.

When any of the disc retaining means 24 is turned outward, the second gear 29 of the delivered disc retaining means 24 shall stop with its tooth body just staying in the tooth space between the two first gears 28 at each side of the second gear 28. That is, when a disc retaining means 24 is turned out of the disc container 10, the second gear 29 thereof is temporarily prevented from moving leftward or rightward along the support spindle 27 because it is stopped by the tooth body of the two first gears 28 at its two sides. The first gears 28 shall have their tooth space aligned again only when the turned out disc retaining means 24 returns back to its original position in the case portion 16. Only at this point can the second gear 29 move leftward or rightward along the support spindle 27. By this way, it can be assured that the thumb tab 31 would not displace when there is any disc retaining means 24 at an outward delivered position and that the returning of the outward delivered disc retaining means 24 would apply force on the spring 30 for the latter to generate a spring force which can be used in the next selection of desired disc to automatically deliver the selected disc retaining means 24.

Figure 5:
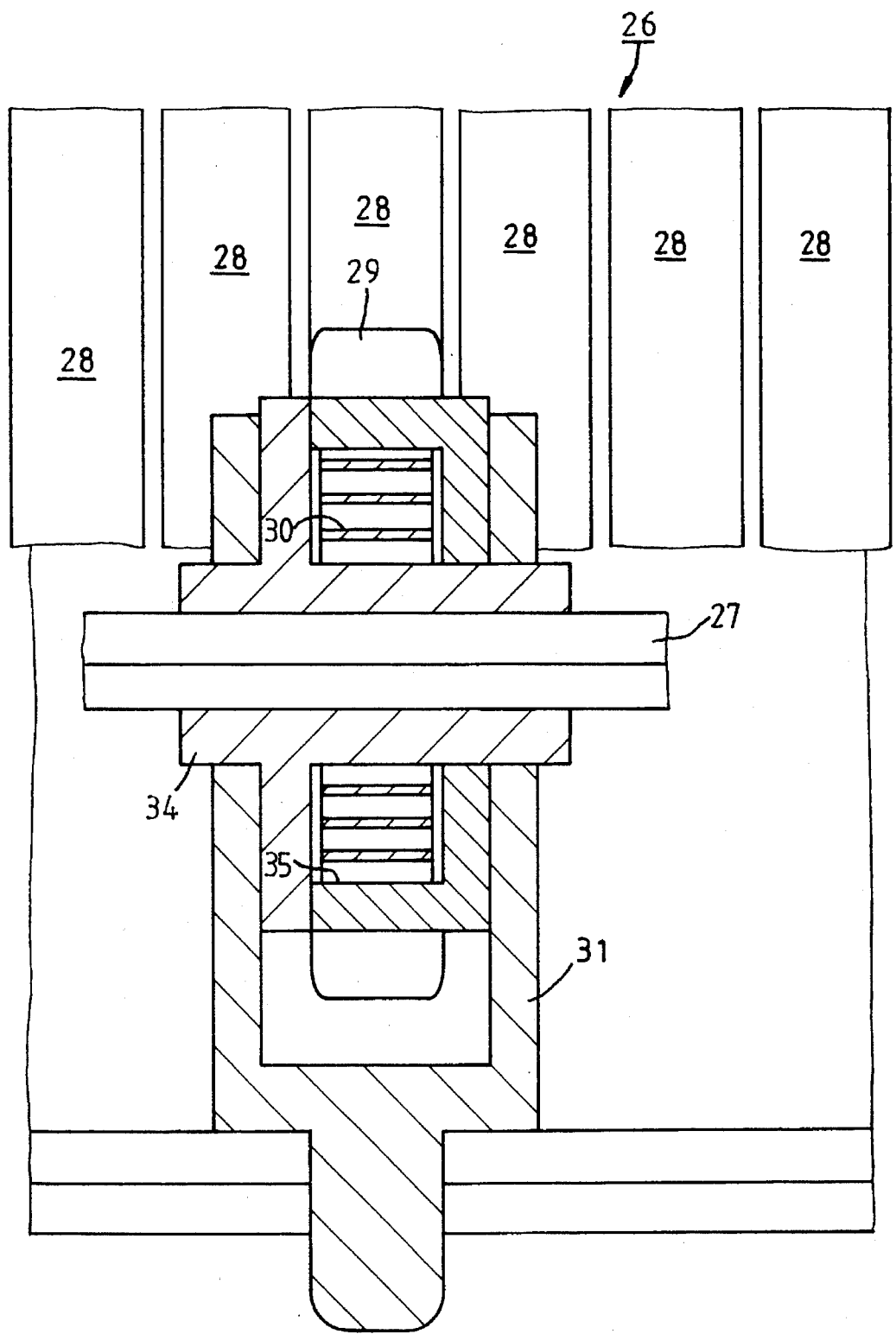
FIG. 5 is a fragmentary, enlarged sectional view taken on line II—II of FIG. 4.
Figure 6:
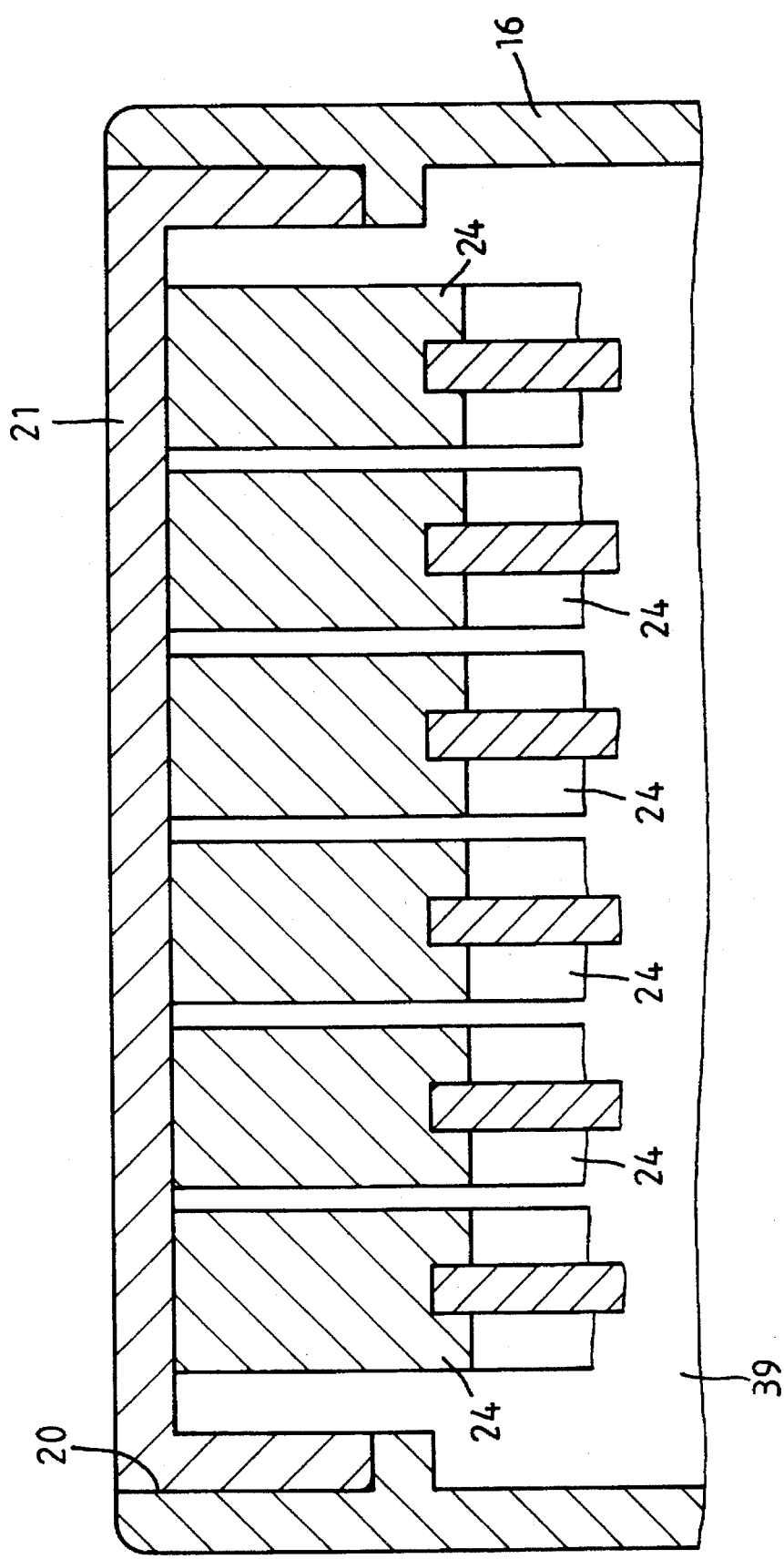
FIG. 6 is a fragmentary, enlarged sectional view taken on line III—III of FIG. 4.

As shown in FIGS. 4 and 5, when the thumb tab 31 drives the second gear 29 to move leftward or rightward along the support spindle 27, the second gear 29 itself has the "potential" to rotate due to the turning force of the spring 30 exerted on the second gear 29. However, since the clearance between every two first gears 28 is smaller than the thickness of the second gear 29, the second gear 29 shall always engage with any one or two first gears 28 when the second gear 29 moves along the first gears 28. As a result, the "potential" of the second gear 29 to rotate would not converse into a "movement", and accordingly, the spring 30 would not become loose because of lacking an origin of force.

In addition, since all the first gears 28 and the second gear 29 have been designed with lead angles at their edges, the second gear 29 may smoothly slide along and engage with the first gears 28 for selection of a desired disc.

Please refer back to FIG. 5. The disc locating and delivering mechanism 26 shall be now described in more details as follows. The disc locating and delivering mechanism 26 includes a sliding axle sleeve 34 which is put over the support spindle 27 with the second gear 29 put over the sliding axle sleeve 34. The second gear 29 is provided with a spring chamber 35 for receiving the spring 30 therein. The spring 30 is fixedly connected at an inner end to the sliding axle sleeve 34 and at an outer end to the spring chamber 35.

Figure 8:
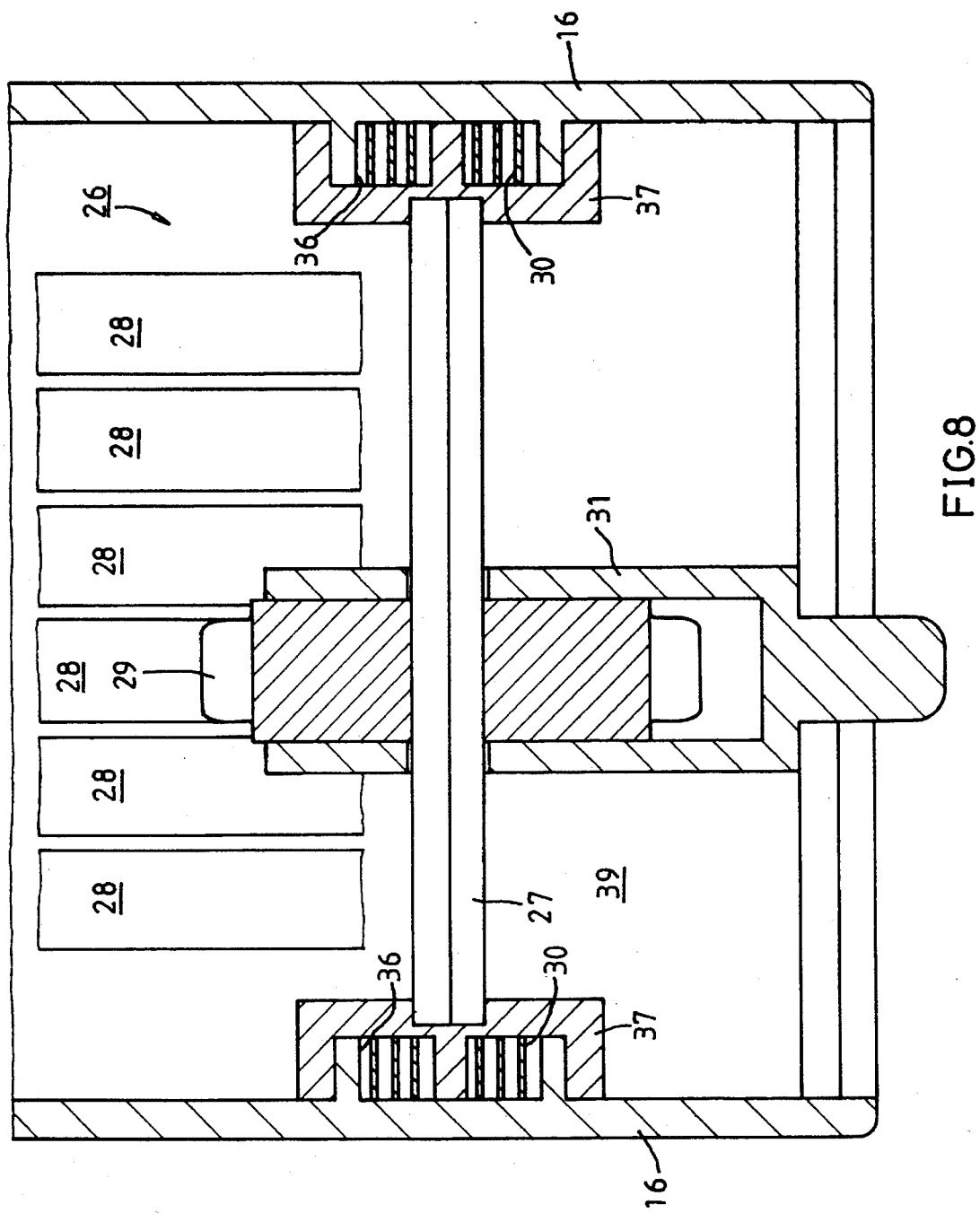
FIG. 8 is a fragmentary, enlarged sectional view showing another embodiment of the disc delivery mechanism of the present invention.
Figure 9:
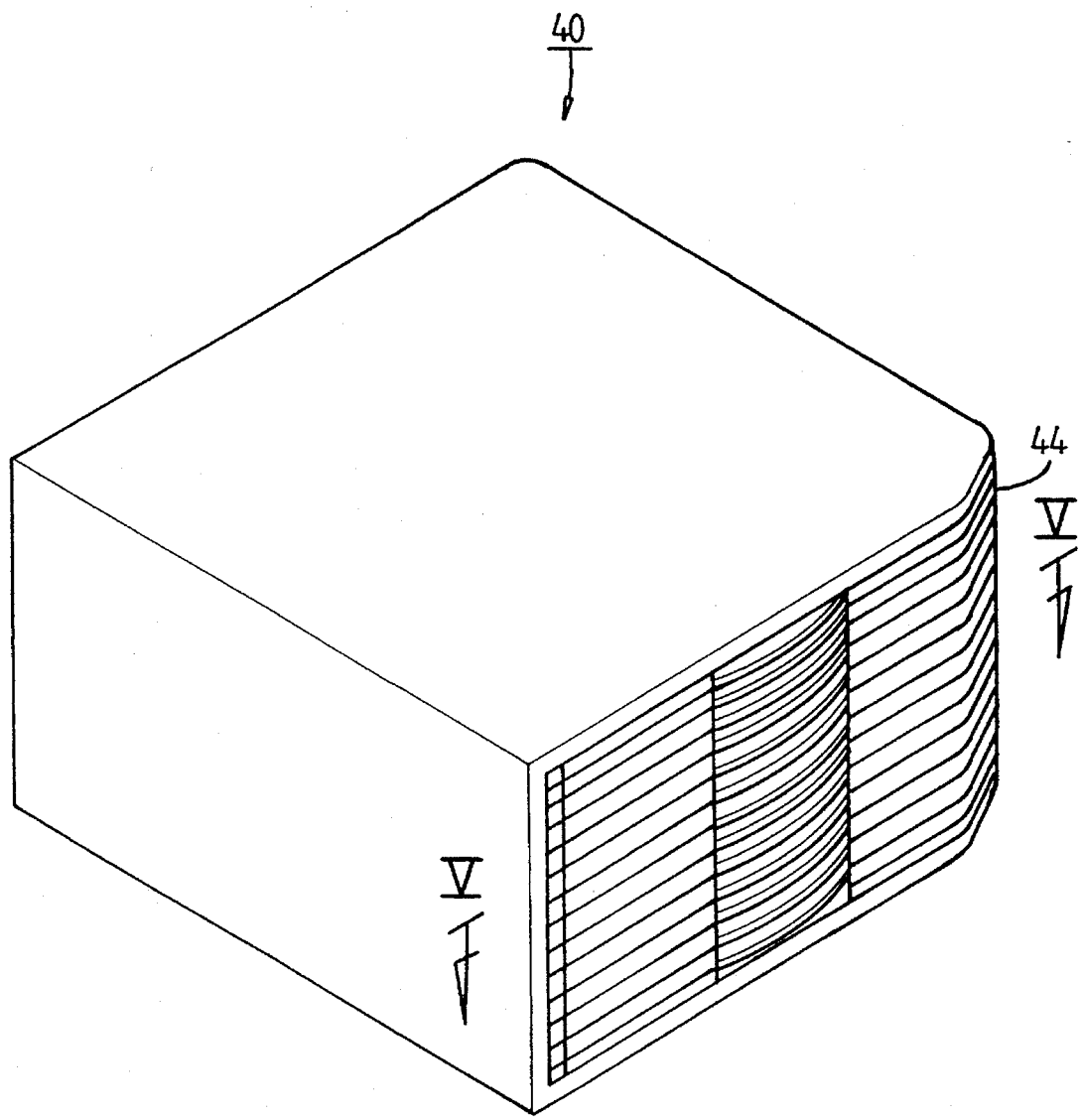
FIG. 9 is a perspective view of a conventional disc container.
Figure 10:
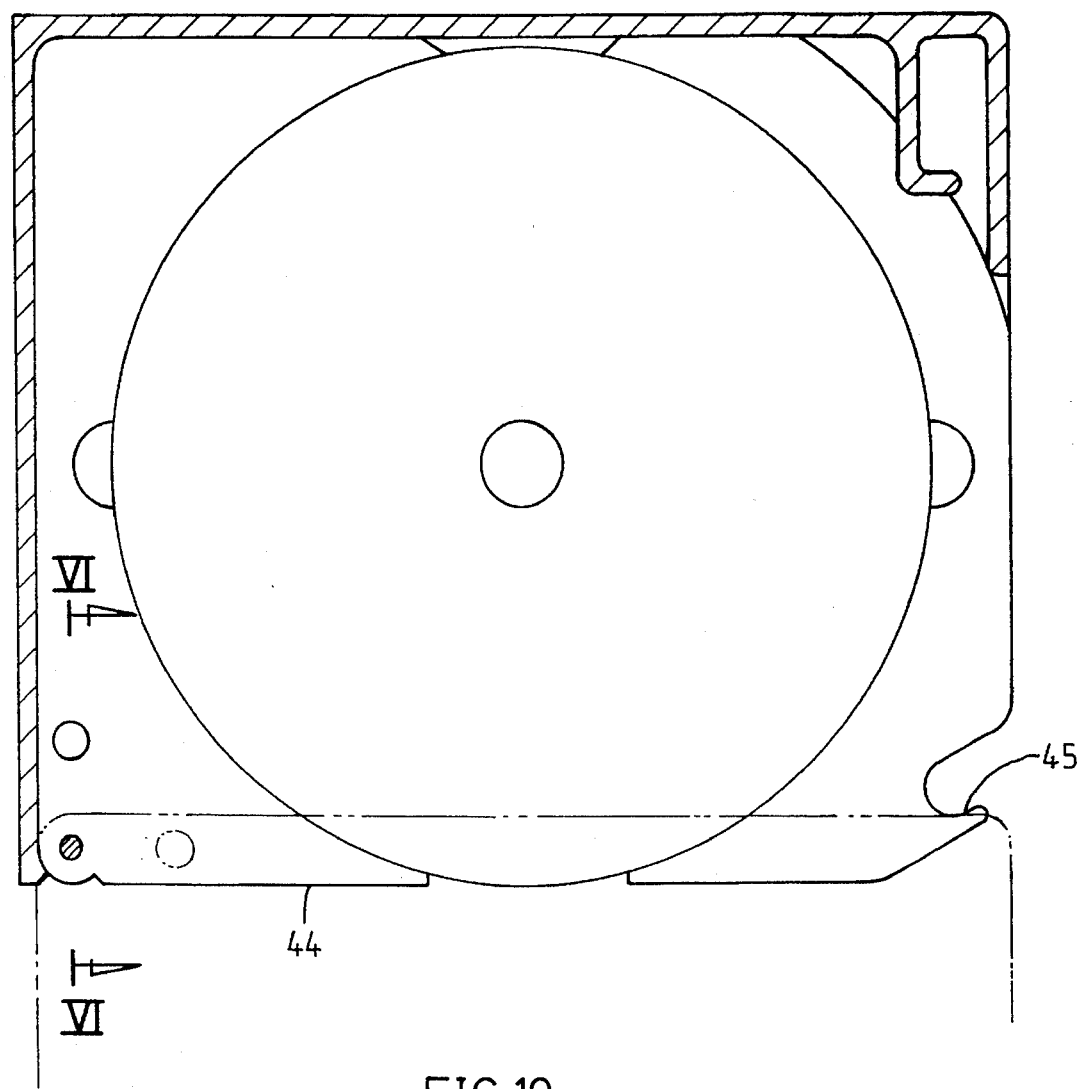
FIG. 10 is a sectional view taken on line V—V of FIG. 9.
Figure 12:
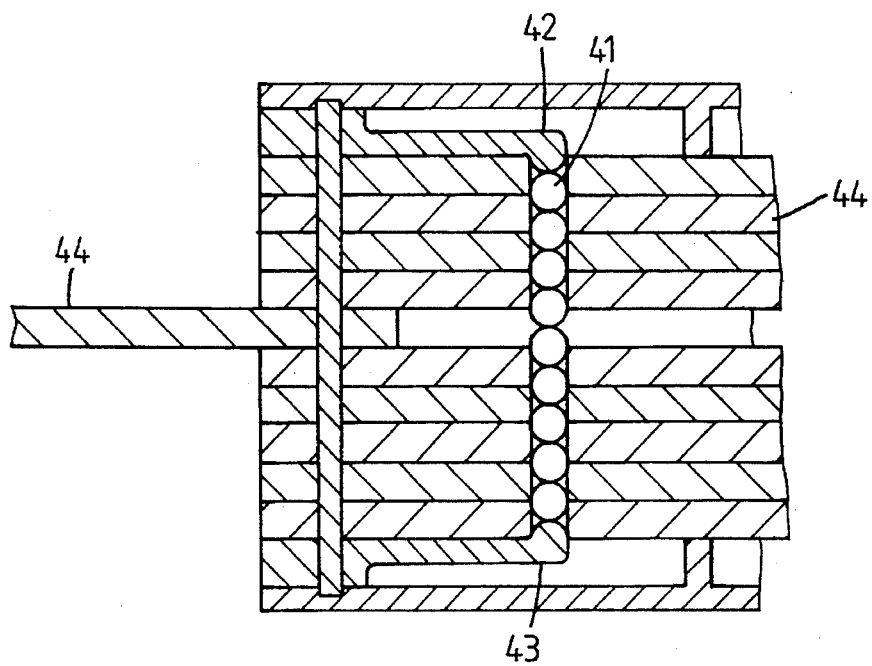
FIG. 12 is a sectional view similar to FIG. 11 with one desired disc retaining plate being extended out of the disc container.
Figure 11:
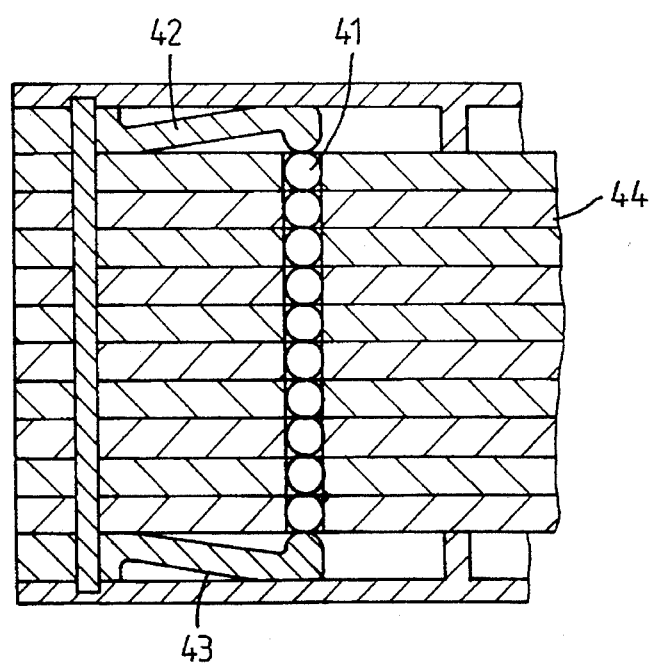
FIG. 11 is a sectional view taken on line VI—VI of FIG. 10.

FIG. 8 illustrates another embodiment of the disc locating and delivering mechanism 26. In this second embodiment, the mechanism 26 includes fixing recesses 36 and rotating sleeves 37. The fixing recesses 36 are formed inside the case portion 16 at one or two sides thereof. The rotating sleeves 37 are put over and cover the fixing recesses 36. A spring 30 is disposed in each of the fixing recesses 36 with an outer end of the spring 30 fixedly connected to the fixing recess 36 and an inner end fixedly connected to the rotating sleeve 37. The support spindle 27 is fixedly connected to the rotating sleeves 37, or alternatively, rotatably connected at at least one end to the inner wall of the case portion 16. The second gear 29 is put over and around the support spindle 27 such that it may rotate together with the support spindle 27 at the same time. By means of the thumb tab 31, the second gear 29 can be clamped to move along the support spindle 27.

The spring 30 may be a coil spring or a torsion spring. In addition, oil with high viscosity can be added to the disc locating and delivering mechanism 26 so that the second gear 29 may rotate slowly under the viscous damping of the highly viscous oil, and thereby, the disc retaining means 24 can be opened and delivered out of the disc container 10 at a lower speed.

The advantages of the present invention can be summarized as follows:

1. The hook portion 32 of the thumb tab 31 can be freely moved to any locating portion 19 of the disc-selection sliding guide 18, allowing a selected and desired disc retaining means 24 to move with the cover portion 21 away from the opening 20; when the cover portion 21 is opened, the desired disc A shall automatically appear. It is very convenient to use such a disc container.
2. Each of the disc retaining means 24 is held by retaining spring leaves 33 at the support ends 25 so as to prevent the non-selected disc retaining means 24 from being delivered outward along with the selected one.
3. Due to the beautiful cooperation of the first gears 28 with the second gear 29, the disc locating and delivering mechanism 26 of the present invention may effectively control the outward movement of one single desired disc retaining means 24.
4. The disc container 10 according to the present invention can be safely closed and therefore, the discs stored therein are not easily exposed to the dust in the air.

What is claimed is:

1. An automatic disc delivering container for digital signal recording discs comprising:

a housing, at least two disc retaining means disposed inside said housing, and a disc locating and delivering mechanism disposed inside said housing;

said housing consisting of a case portion and a cover portion; said case portion providing a space therein for receiving discs to be packed and carried by said disc container, said case portion including a first hook, a disc selection sliding guide disposed at a first edge of said housing and formed with a plurality of locating portions, and an opening formed therein, said cover portion being pivotally connected at one end to said case portion for freely closing or moving away from said opening of said case portion, said cover portion including a second hook disposed at another end of said cover portion to engage with or disengage from said first hook, and a rotating setting portion for stopping said case portion when said cover portion is opened so that said cover portion is opened relative to said case portion to a limited angle;

said disc retaining means being superposed on one another and pivotally connected at one end to said case portion so as to respectively rotate relative to said case portion, each of said disc retaining means having two springy support ends;

said disc locating and delivering mechanism comprising a support spindle mounted inside said case portion, a first gear separately disposed at one end of each said disc retaining means, a second gear rotatably mounted on said support spindle and being slidingly displaceable on said support spindle to selectively engage with said first gear of one of said disc retaining means, a spring being disposed between said second gear and said support spindle or between said support spindle and said case portion so that said second gear may rotate relative to said case portion, and a thumb tab having an integrally formed hook portion to selectively engage with one of said locating portions of said case portion and being disposed on said support spindle for clamping said second gear to move therewith along said support spindle; and, said spring being compressed to generate a spring force responsive to said cover portion being closed relative to said case portion, said spring driving said second gear to rotate responsive to said cover portion being opened, said second gear in turn driving said first gear of a disc retaining means selected by displacement of said thumb tab by a user and thereby causing said selected disc retaining means to automatically spring out of said disc container through said opening in said case portion.

2. The automatic disc delivering container for digital signal recording discs as recited in claim 1, wherein said case portion further includes one or more holding spring leaves disposed in said case portion to each engage a respective support end of a non-selected disc retaining means and prevent said non-selected disc retaining means from being displaced with said selected one.

3. The automatic disc delivering container for digital signal recording discs as recited in claim 1, wherein said disc locating and delivering mechanism further comprises a sliding axle sleeve mounted on said support spindle with said second gear being rotatably mounted on said sliding axle sleeve, said second gear being formed with a spring chamber to receive said spring therein, said spring having one end fixedly connected to said sliding axle sleeve and another end fixedly connected to said second gear within said spring chamber, said second gear being movable along said support spindle by the clamping of said second gear by said thumb tab.

4. The automatic disc delivering container for digital signal recording discs as recited in claim 1, wherein said disc locating and delivering mechanism comprises at least one fixing recess integrally formed inside said case portion to receive said spring therein, and at least one rotating sleeve corresponding to and being mounted on said fixing recess, one end of said spring being fixedly connected to said fixing recess and an opposing end of said spring being fixedly connected to said rotating sleeve, said support spindle being coupled to said rotating sleeve for rotation therewith and said second gear being coupled to said support spindle for corresponding rotation with both said second gear and said rotating sleeve., said thumb tab clamping said second gear for displacing said second gear along said support spindle responsive to displacement of said thumb tab by a user.

5. The automatic disc delivering container for digital signal recording discs as recited in claim 1, 2, 3, or 4, wherein said spring is a coil spring or a torsion spring.

6. The automatic disc delivering container for digital signal recording discs as recited in claim 1, 2, 3, or 4, wherein said disc locating and delivering mechanism includes a highly viscous oil for providing viscous damping and thereby enable said disc retaining means to be displaced at a lower speed.

* * * * *